United States Patent
Nagasu

(10) Patent No.: US 10,995,030 B2
(45) Date of Patent: May 4, 2021

(54) MANUFACTURING METHOD OF OPTICAL FIBER PREFORM

(71) Applicant: Fujikura Ltd., Tokyo (JP)

(72) Inventor: Katsubumi Nagasu, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/390,906

(22) Filed: Apr. 22, 2019

(65) Prior Publication Data

US 2019/0248695 A1    Aug. 15, 2019

Related U.S. Application Data

(63) Continuation of application No. PCT/JP2017/037538, filed on Oct. 17, 2017.

(30) Foreign Application Priority Data

Oct. 25, 2016  (JP) .............................. JP2016-208687

(51) Int. Cl.
  *C03C 25/68* (2006.01)
  *C03B 37/018* (2006.01)
  *C03B 37/012* (2006.01)

(52) U.S. Cl.
  CPC ...... *C03B 37/01228* (2013.01); *C03B 37/018* (2013.01); *C03B 37/01853* (2013.01); *C03C 25/68* (2013.01)

(58) Field of Classification Search
  CPC .............................. C03B 37/018; C03C 25/68
  See application file for complete search history.

(56) References Cited

U.S. PATENT DOCUMENTS 4,863,501 A    9/1989  Mansfield
2003/0209516 A1  11/2003  Wu
(Continued)

FOREIGN PATENT DOCUMENTS

JP    S62-182132 A    8/1987
JP    H02-018334 A    1/1990
(Continued)

OTHER PUBLICATIONS

Office Action issued in corresponding Japanese Patent Application No. 2016-208687 dated May 29, 2018 (3 pages).
(Continued)

*Primary Examiner* — Erin Snelting
(74) *Attorney, Agent, or Firm* — Osha Bergman Watanabe & Burton LLP

(57) ABSTRACT

A manufacturing method of an optical fiber preform used to produce an optical fiber includes: etching a surface of a core preform that forms a core of the optical fiber with a plasma flame in a chamber; obtaining a porous preform by depositing glass particles on an etched surface of the core preform to form an outside vapor-deposited layer that forms a cladding of the optical fiber in a state where the core preform is put into the chamber; and heating and sintering the porous preform. When obtaining the porous preform, the outside vapor-deposited layer is formed by repeatedly performing the deposition of the glass particles multiple times through supply of source material gas. In a first deposition among the multiple times of deposition of the glass particles, a flow rate of the source material gas is less than or equal to 50% of a stable value.

9 Claims, 4 Drawing Sheets

(56) References Cited

U.S. PATENT DOCUMENTS

| | | | |
|---|---|---|---|
| 2004/0221618 A1 | 11/2004 | Gotoh et al. | |
| 2005/0262877 A1* | 12/2005 | Balakrishnan | C03B 37/01413 65/421 |
| 2014/0161406 A1* | 6/2014 | Kumano | C03B 37/01446 385/128 |
| 2015/0040616 A1 | 2/2015 | Nakajima | |

FOREIGN PATENT DOCUMENTS

| | | |
|---|---|---|
| JP | H07-025625 A | 1/1995 |
| JP | 2004-010368 A | 1/2004 |
| JP | 2004-224649 A | 8/2004 |
| JP | 2013-035722 A | 2/2013 |
| JP | 2014-028741 A | 2/2014 |
| JP | 2015-006971 A | 1/2015 |
| JP | 5771943 B2 | 9/2015 |

OTHER PUBLICATIONS

Notice of Allowance issued in corresponding Japanese Patent Application No. 2016-208687 dated Nov. 6, 2018 (3 pages).

* cited by examiner

MANUFACTURING METHOD OF OPTICAL FIBER PREFORM

CROSS REFERENCE TO RELATED APPLICATIONS

This is a continuation application of International Patent Application No. PCT/JP2017/037538, filed on Oct. 17, 2017, which claims priority to Japanese Patent Application No. 2016-208687, filed on Oct. 25, 2016. The contents of the International Patent Application are hereby incorporated by reference.

TECHNICAL FIELD

The present invention relates to a manufacturing method for an optical fiber preform.

BACKGROUND

A so-called silica core optical fiber including a core that is formed of substantially pure silica glass and a cladding that is formed of silica glass doped with fluorine can achieve lower transmission loss than a general germanium-doped core optical fiber (including a core that is formed of silica glass doped with germanium and a cladding that is formed of pure silica glass). The reason for this is that, since the core is formed of pure silica glass, substantially no fluctuation in concentration occurs and Rayleigh scattering is suppressed.

An optical fiber preform of producing the optical fiber can be produced, for example, using a method described in Patent Document 1 (Japanese Patent No. 5771943) including: preparing a core preform using a VAD method (vapor-phase axial deposition method); putting the core preform into a pipe that forms an inner cladding layer; integrating the core preform with the pipe by collapsing the pipe; and further forming a layer that forms an outer cladding layer using an outside vapor-deposition method.

However, in a case where an optical fiber preform is prepared using the method described in Patent Document 1, there is a variation in the sizes and the refractive index of a core preform and a pipe. Therefore, in order to integrate an optimum combination of a core preform and a pipe, it is necessary to prepare a plurality of core preforms and a plurality of pipes. In addition, the inner diameter and the outer diameter of a core preform and a pipe in a longitudinal direction are not uniform, and thus characteristics thereof in the longitudinal direction vary.

In addition, in the manufacturing method of Patent Document 1, a pipe preparation step (for example, drilling or cleaning) or a collapsing step that is not typically required during the production of a general Ge core optical fiber is required, and thus the costs are high. In addition, impurities are likely to be incorporated during drilling or cleaning, and thus the transmission loss is likely to increase. Further, in a case where the thickness of a pipe is large, it is difficult to collapse the pipe, which is not suitable for increasing the size of a preform.

In a case where an outside vapor-deposition method is adopted to form an inner cladding, the above-described circumstances can be avoided to some extent.

However, in a silica core optical fiber, in a case where the bulk density of a soot deposited layer is increased in order to prevent delamination or deviation between a core preform and an inner cladding, the diffusion of fluorine as a dopant in an inner cladding may be insufficient.

In a case where the flow rate of source material gas is reduced during the formation of the soot deposited layer, the diffusion of fluorine is improved. In this case, however, the productivity may deteriorate.

SUMMARY

One or more embodiments of the present invention provide a manufacturing method of an optical fiber preform in which the diffusion of fluorine in a soot deposited layer can be improved, deviation and delamination of the soot deposited layer can be prevented, and deterioration in productivity can be suppressed.

According to one or more embodiments of the present invention, a manufacturing method of an optical fiber preform used to produce an optical fiber, the optical fiber including a core that is formed of silica glass and a cladding that is formed around an outer circumference of the core, the manufacturing method includes: an etching step of etching a surface of a core preform that forms the core with a plasma flame in a chamber; a deposition step of obtaining a porous preform by depositing glass particles on an etched surface of the core preform to form an outside vapor-deposited layer that forms the cladding in a state where the core preform is put into the chamber; and a sintering step of heating and sintering the porous preform, in which in the deposition step, the outside vapor-deposited layer is formed by repeatedly performing the deposition of the glass particles multiple times (i.e., twice or more) through supply of source material gas, in at least a first deposition among the multiple times of deposition of the glass particles, a flow rate of the source material gas is 50% or lower with respect to a stable value, and a temperature of the etched surface of the core preform at a start of the deposition step is 50° C. or higher.

In one or more embodiments, in the deposition step, the flow rate of the source material gas may continuously increase until the flow rate of the source material gas reaches the stable value from the flow rate in the first deposition.

In one or more embodiments, an average bulk density of the outside vapor-deposited layer may be 0.17 g/cm$^3$ to 0.33 g/cm$^3$.

In one or more embodiments, before the sintering step and after the deposition step, the porous preform may be heated in an atmosphere of gas containing a chlorine atom.

In one or more embodiments, an outer diameter of the outside vapor-deposited layer after the sintering step may be 5 times or less of an outer diameter of the core preform.

In one or more embodiments, in the etching step, an outer diameter of the core preform may be reduced by 0.5 mm or more.

In one or more embodiments, before the deposition step and after the etching step, the core preform may be heated with a plasma flame.

According to one or more embodiments of the present invention, in at least single deposition until the stable value is reached, the flow rate of the source material gas is lower than the stable value. Therefore, the thin and hard deposited layer can be formed at an early stage of the formation of the outside vapor-deposited layer. Since the deposited layer is hard, deviation and delamination of the outside vapor-deposited layer from the core preform are not likely to occur. In addition, since the deposited layer is thin, fluorine atoms are easily diffused. Accordingly, in one or more embodiments of the present invention, appropriate fluorine diffusion in the outside vapor-deposited layer and the prevention of deviation and delamination of the outside vapor-deposited layer can be simultaneously realized.

In addition, since the flow rate of the silica glass source material gas reaches the stable value in any deposition in a range of 0% (start) to 20% with respect to all the multiple times of deposition, deterioration in productivity can be suppressed.

DETAILED DESCRIPTION

Hereinafter, each of the steps in a manufacturing method of an optical fiber preform according to one or more embodiments of the present invention will be described in detail.

(Core Preform Preparation Step)

According to one or more embodiments, a method of preparing a core preform is a method of using a soot method such as a vapor-phase axial deposition method. For example, in one or more embodiments, a method in which a dehydration (anhydrous) treatment of heating silica glass particles in an atmosphere of a dehydrating agent (for example, halogen gas, in particular, chlorine gas) at a temperature (for example, approximately 1100° C. to 1300° C.) where the form of the silica glass particles can be maintained is performed, and subsequently the dehydrated silica glass particles are heated (for example, 1400° C. to 1600° C.) and sintered in an atmosphere of inert gas (for example, helium gas) for transparent vitrifying.

The core preform is formed of silica glass substantially not containing germanium.

The core preform may be elongated in a longitudinal direction.

(Etching Step)

Figure 1:
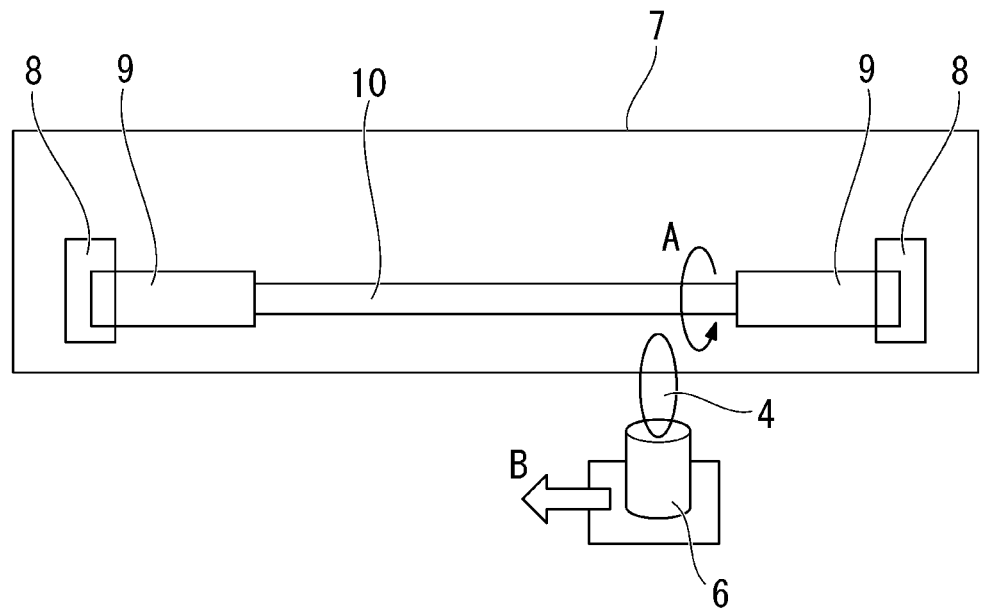
FIG. 1 is a schematic view showing an etching step in a manufacturing method of an optical fiber glass preform according to one or more embodiments of the present invention.

FIG. 1 is a schematic view showing an etching step in the manufacturing method of an optical fiber glass preform according to one or more embodiments.

As shown in FIG. 1, a dummy preform 9 is coaxially connected to each of end portions of a core preform 10 having a rod shape (round rod shape). The dummy preforms 9 are held by a pair of rotary chucks 8 and 8. The core preform 10 is rotatable around an axis as indicated by an arrow A and is provided in a reaction container 7 (chamber).

A surface of the core preform 10 is etched with a plasma flame.

The etching treatment can be performed with a plasma flame generated using, for example, a plasma torch 6 (plasma flame generation means). A method of generating a plasma flame may be appropriately selected in consideration of handleability, safety, the type of a heat source, or the like. In one or more embodiments, a method of generating a plasma flame is applying a voltage to gas as a plasma source to generate a spark.

Examples of the gas as a plasma source include argon (Ar) gas. In one or more embodiments, the voltage applied for the generation of the plasma flame is a high-frequency voltage, and, in one or more embodiments, the frequency of the voltage is 2 MHz to 2.45 GHz.

In one or more embodiments, the etching gas to be added to the plasma flame is fluorine-containing gas. The fluorine-containing gas is not particularly limited as long as it is gas containing a fluorine atom in a chemical structure. Examples of the fluorine-containing gas in accordance with one or more embodiments, from the viewpoints of etching performance and costs, include sulfur hexafluoride ($SF_6$), ethane hexafluoride ($C_2F_6$), silicon tetrafluoride ($SiF_4$), and methane tetrafluoride ($CF_4$).

As the fluorine-containing gas, one type may be used alone, or two or more types may be used in combination.

Depending on the type of the etching gas, oxygen gas ($O_2$) gas as combustion-supporting gas may be added to the plasma flame to promote decomposition of the etching gas. For example, in one or more embodiments where $C_2F_6$ gas is used as the etching gas, the etching gas is used in combination with oxygen gas.

The etching treatment can be performed by moving the plasma torch 6 relative to the core preform 10 along a longitudinal direction of the core preform 10. "Moving the plasma torch 6 relative to the core preform 10" represents any one of (I) moving the plasma torch 6 in a state where the core preform 10 is fixed, (II) moving the core preform 10 in a state where the plasma torch 6 is fixed, and (III) moving both of the core preform 10 and the plasma torch 6 (except for a case where absolute values of moving speeds and moving directions are the same).

Both of the core preform 10 and the plasma torch 6 are moved along the longitudinal direction (central axis direction) of the core preform 10. At this time, the moving directions may be any direction among two directions. For example, in the case of (III), the core preform 10 and the plasma torch 6 may be moved in the same direction or opposite directions. In a case where the etching treatment is performed multiple times, all the moving directions may be the same as each other, all the moving directions may be different from each other (the moving direction may be changed alternately), the moving direction may be changed on a two-time basis per one direction, or the moving direction may be sometimes changed.

From the start to the end of the etching treatment, the absolute value of the speed of the relative movement of the plasma torch 6 may be fixed or variable and, in one or more embodiments, is fixed. By setting the absolute value of the speed of the relative movement of the plasma torch 6 to be fixed, an effect of suppressing a variation in etching amount in the longitudinal direction of the core preform 10 is high.

In one or more embodiments, the etching amount in the etching treatment (etching distance from the surface of the core preform 10 in a depth direction) is 0.25 mm or more and, in one or more embodiments, may be 0.3 mm or more. That is, in one or more embodiments, a reduction in the outer diameter of the core preform 10 caused by the etching treatment is 0.5 mm or more and, in one or more embodiments, may be 0.6 mm or more.

As a result, foreign material, impurities, and the like on the surface of the core preform 10 can be removed, and thus the surface of the core preform 10 can be cleaned. In addition, damage to the surface of the core preform 10 can be reduced. Therefore, deposition of the silica glass particles described below can be performed in a state where the surface of the core preform 10 is clean and not damaged. The core preform 10 forms a core through which most optical signals pass through in an optical fiber. Therefore, by maintaining the core preform 10 in a clean state, an increase in transmission loss (for example, transmission loss at a wavelength of 1.55 μm) can be effectively suppressed. In addition, since the core preform 10 can be maintained in a clean state, the number of breakings in a drawing step can be reduced.

The outer diameter of the core preform 10 can be measured using, for example, a well-known method in which a laser outer diameter measuring device or the like is used.

For example, in FIG. 1, the etching treatment can be performed by rotating the core preform 10 in an arrow A direction, fixing the core preform 10 to the longitudinal direction, and moving the plasma torch 6 in an arrow B direction (left) along the longitudinal direction. Reference numeral 4 represents the plasma flame. In the etching step, the rotational speed of the core preform 10 is 5 to 40 rpm.

One side of the reaction container 7 is connected to an exhaust duct (not shown). The internal pressure of the exhaust duct is typically set to be a negative pressure of approximately 20 to 300 Pa, and by supplying clean air from the outside of the reaction container 7, the internal pressure of a booth (not shown) where the reaction container 7 is placed is adjusted to be a positive pressure of approximately 3 to 30 Pa.

Due to the etching treatment, scratches, foreign material, impurities, and the like on the surface of the core preform 10 are removed.

For example, a hydroxyl group or the like formed by flame polishing or the like that is performed during, for example, the welding of the dummy preforms 9 or the elongation of the core preform 10 is removed. For the generation of a plasma flame, it is not necessary to use hydrogen gas unlike an oxy-hydrogen flame. Therefore, water is not produced during the etching treatment, and remaining of a hydroxyl group in the etched surface of the core preform 10 is suppressed.

(Preheating Step)

After the etching treatment, the etched surface of the core preform 10 may be preheated using a plasma flame different from that of the etching treatment. In the preheating treatment, a plasma flame generated by the plasma torch 6 can be used. Due to the preheating treatment, the remaining of a hydroxyl group in the etched surface of the core preform 10 is suppressed. In a case where the plasma flame is used, the plasma torch 6 used in the previous step (etching step) can be used as it is. Therefore, the core preform 10 can be efficiently heated.

At the start of the deposition of the silica glass particles, in one or more embodiments, the temperature of the etched surface of the core preform 10 is 50° C. or higher and, in one or more embodiments, may be 60° C. or higher due to reasons described below. In one or more embodiments, the temperature of the etched surface of the core preform 10 is 400° C. or lower and, in one or more embodiments, may be 350° C. or lower due to reasons described below.

Examples of the gas as a plasma source include argon (Ar) gas. Oxygen ($O_2$) gas as combustion-supporting gas can also be added to the argon gas. In one or more embodiments, the gas does not contain fluorine or hydrogen. For example, only argon gas or a mixed gas of argon and oxygen ($O_2$) can be used.

By using the gas not containing fluorine and hydrogen, excessive etching and the production of a hydroxyl group can be suppressed in the core preform 10.

(Deposition Step)

Figure 2:
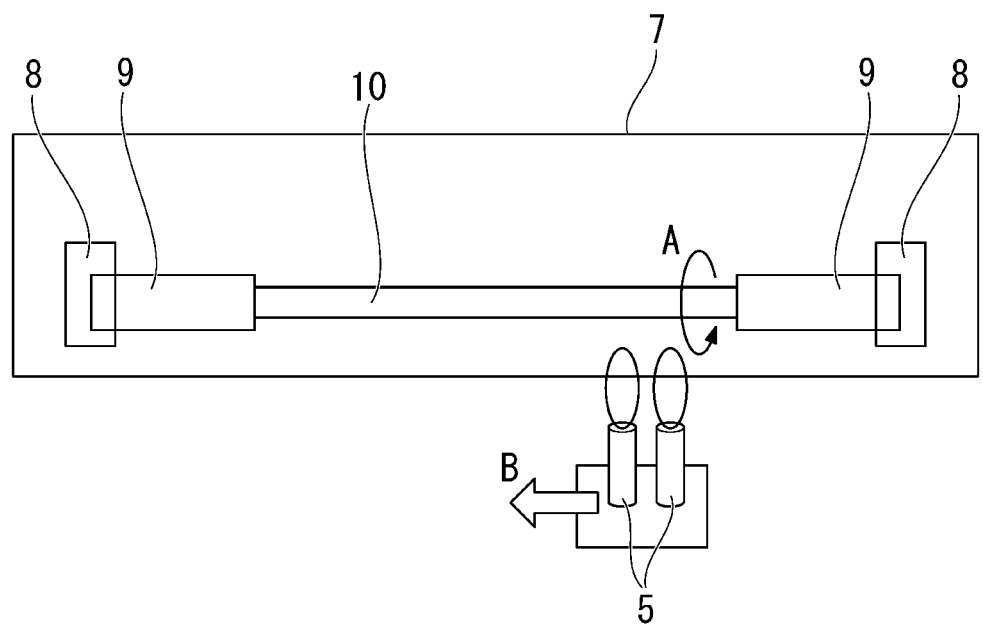
FIG. 2 is a schematic view showing a deposition step in the manufacturing method of an optical fiber glass preform according to one or more embodiments of the present invention.

FIG. 2 is a schematic view showing a deposition step in the manufacturing method of an optical fiber glass preform according to one or more embodiments of the present invention.

In this step, a porous silica preform for an optical fiber is obtained by depositing, for example, silica glass particles on the etched surface of the core preform 10 to form a soot deposited layer (outside vapor-deposited layer) in a state where the core preform 10 is put into the reaction container 7.

In this step, the soot deposited layer is formed in a state where the core preform 10 is put into the reaction container 7. Therefore, the deposition of the silica glass particles can be started while maintaining the core preform 10 in a clean state where foreign material, impurities, and the like are removed. Therefore, an increase in transmission loss can be suppressed with high reproducibility. The core preform 10 forms a core through which most optical signals pass through in an optical fiber. Therefore, by maintaining the core preform 10 in a clean state, an increase in transmission loss can be effectively suppressed. In addition, since the core preform 10 can be maintained in a clean state, the number of breakings in a drawing step can be reduced.

By forming the soot deposited layer in a state where the core preform 10 is put into the reaction container 7, the deposition of the silica glass particles can be started while maintaining the core preform 10 at a high temperature due to the heating in the previous step (etching step). Therefore, the soot bulk density of the soot deposited layer near an interface with the core preform 10 is likely to increase (that is, is likely to become harder), and delamination of the soot deposited layer from the core preform 10 can be prevented during sintering.

At the start of the deposition of the silica glass particles, the temperature of the etched surface of the core preform 10 is 50° C. or higher. In one or more embodiments, the temperature of the etched surface of the core preform 10 is 60° C. or higher. As a result, in the optical fiber glass preform, an effect of suppressing delamination and deviation between the core preform 10 and the soot deposited layer is further improved.

At the start of the deposition of the silica glass particles, in one or more embodiments, the temperature of the etched surface of the core preform 10 is 400° C. or lower and, in one or more embodiments, may be 350° C. or lower. As a result, in the optical fiber glass preform, an effect of reducing the amount of a hydroxyl group without affecting characteristics thereof is further improved. Typically, as the temperature of the etched surface decreases, water is not likely to be bonded to (reactive with) the etched surface and thus can be easily removed therefrom. Therefore, the dehydration effect is improved during the dehydration and sintering treatment of the porous preform.

The temperature of the etched surface can be easily measured, for example, using a well-known method in which a thermo tracer or a non-contact type laser radiation thermometer is used.

In one or more embodiments, the depositing silica glass particles are produced in an oxy-hydrogen flame using silica glass source material gas, hydrogen ($H_2$) gas, oxygen gas, and inert gas.

Examples of the silica glass source material gas include silicon tetrachloride ($SiCl_4$) gas and organic silicon gas such as OMCTS gas or HMDSO gas.

Examples of the inert gas include argon gas and nitrogen gas.

In one or more embodiments, the deposition temperature of the silica glass particles is 600° C. to 1250° C. and, in one or more embodiments, may be 700° C. to 1200° C.

In one or more embodiments, the deposition of the silica glass particles is performed by moving a silica glass burner 5 that produces silica glass particles relative to the core preform 10 along the longitudinal direction of the core preform 10 while rotating the core preform in the arrow A direction. As in the case of the plasma torch 6, "moving the silica glass burner 5 relative to the core preform 10" represents any one of (i) moving the silica glass burner 5 in a state where the core preform 10 is fixed, (ii) moving the core preform 10 in a state where the silica glass burner 5 is fixed, and (iii) moving both of the core preform 10 and the silica glass burner 5 (except for a case where absolute values of moving speeds and moving directions are the same).

Both of the core preform 10 and the silica glass burner 5 are moved along the longitudinal direction (central axis direction) of the core preform 10. At this time, the moving directions may be any direction among two directions. For example, in the case of (III), the core preform 10 and the silica glass burner 5 may be moved in the same direction or opposite directions.

In a case where the deposition of the silica glass particles is performed multiple times, all the moving directions may be the same as each other, all the moving directions may be different from each other (the moving direction may be changed alternately), the moving direction may be changed on a two-time basis per one direction, or the moving direction may be changed sometimes.

In a case where two burners are provided in one unit as shown in FIG. 2, the silica glass particles can be deposited by the two burners by moving the unit once. Therefore, the number of times of deposition is two. In a case where three or more (n: an integer of 3 or more) burners are provided in one unit, the silica glass particles can be deposited by the n number of burners by moving the unit once. Therefore, the number of times of deposition is n.

From the start to the end of the deposition of the silica glass particles, the absolute value of the speed of the relative movement of the silica glass burner 5 may be fixed or variable and, in one or more embodiments, is fixed. By setting the absolute value of the speed of the relative movement of the silica glass burner 5 to be fixed, the thickness of the soot deposited layer of the silica glass particles is more uniform in the longitudinal direction of the core preform 10.

The details of the internal pressure of the exhaust duct and the internal pressure of the booth where the reaction container 7 is placed are the same as those of the etching step.

The core preform 10 may be rotated around the same axis in a direction opposite to the arrow A direction, and the silica glass burner 5 may be moved in a direction (right) opposite to the arrow B direction. The rotational speed of the core preform 10 may be the same as that of the etching step. That is, in the deposition step, the rotational speed of the core preform 10 is 5 to 40 rpm.

The deposition of the silica glass particles is performed twice or more (that is, multiple times). The number of times of repetition may be appropriately adjusted according to the desired size of the optical fiber glass preform and is, for example, approximately several hundred times.

In at least a first deposition among the multiple times of deposition, the flow rate of the silica glass source material gas is 50% or lower (for example, 5% to 50%) with respect to a stable value.

In one or more embodiments, the flow rate of the silica glass source material gas continuously increases until it reaches the stable value from the flow rate in the first deposition.

In one or more embodiments, the flow rate of the silica glass source material gas reaches the stable value in at least any number of times of deposition in a range of 0% (start) to 20% with respect to all the multiple times of deposition of the silica glass particles. In one or more embodiments, the flow rate of the silica glass source material gas reaches the stable value in at least any number of times of deposition during a period from the first deposition to a number of times of deposition corresponding to 20% with respect to all the multiple times of deposition of the silica glass particles. As a result, deterioration in productivity can be suppressed. In addition, a thin deposited layer can be formed at an early stage of the deposition step.

The flow rate of the silica glass source material gas may reach the stable value in at least any number of times of deposition in a range of 0% (start) to 21% with respect to all the multiple times of deposition of the silica glass particles.

In at least single deposition until the stable value is reached, the flow rate of the silica glass source material gas may be 5% to 50% with respect to the stable value.

Figure 3:
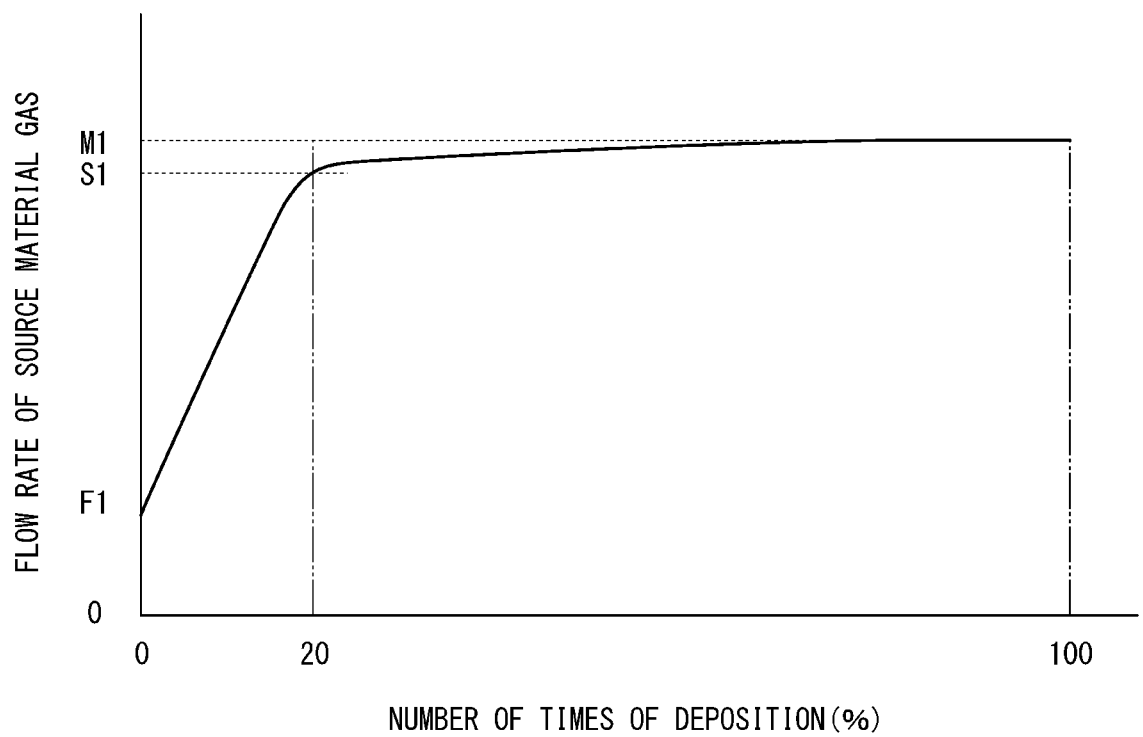
FIG. 3 is a diagram showing a relationship between the number of times of deposition of silica glass particles in the deposition step and a flow rate of silica glass source material gas in the manufacturing method of an optical fiber glass preform according to one or more embodiments of the present invention.

FIG. 3 is a diagram showing a relationship between the number of times (horizontal axis) of deposition of the silica glass particles and the flow rate (vertical axis) of the silica glass source material gas according to one or more embodiments.

In an example shown in the drawing, in the number of times of deposition corresponding to 20% from the first deposition with respect to all the multiple times of deposition, the flow rate of the silica glass source material gas reaches a stable value S1. The stable value S1 may be a value that is 90% or higher (for example, 90% to 100%) with respect to a maximum flow rate M1 of the silica glass source material gas. In this example, the maximum flow rate M1 is the flow rate of the silica glass source material gas in the final deposition of the silica glass particles. However, the maximum flow rate may not be the flow rate in the final deposition.

In this example, a flow rate F1 of the silica glass source material gas in the first deposition is 50% or lower (specifically, a range of 5% to 50%) with respect to the stable value S1.

In the manufacturing method, in at least the first deposition, the flow rate F1 of the silica glass source material gas is 50% or lower with respect to the stable value S1.

Therefore, a thin and hard deposited layer can be formed at an early stage of the formation of the soot deposited layer. Since the deposited layer is hard, deviation and delamination of the soot deposited layer from the core preform 10 are not likely to occur. In addition, since the deposited layer is thin, fluorine atoms are easily diffused. Accordingly, the fluorine diffusion in the soot deposited layer and the prevention of deviation and delamination of the soot deposited layer can be simultaneously realized.

The deviation is a defect in which the soot is displaced in the longitudinal direction with respect to the core preform due to shrinkage of the soot during sintering. Furthermore, a trace of the deviation remains on the optical fiber preform after vitrifying. The deviation is likely to occur when adhesion of the soot deposited layer with respect to the core preform is weak.

The delamination is a defect in which soot deposited layers are delaminated during sintering, and the delaminated part forms hollow after vitrifying.

The delamination is likely to occur when the distribution of the soot bulk density in the radial direction is discontinuous.

The flow rate of the silica glass source material gas continuously increases until it reaches the stable value S1 from the flow rate in the first deposition in the deposition step. As a result, a variation in the flow rate of the source material gas until the stable value S1 can be suppressed. Accordingly, the thin and hard deposited layer can be formed.

In one or more embodiments, the average bulk density of the soot deposited layer is 0.17 g/cm$^3$ to 0.33 g/cm$^3$.

In a case where the bulk density of the soot deposited layer is excessively high, it is difficult to diffuse fluorine as a dopant. Therefore, the refractive index of the cladding cannot be reduced, and in a case where the bulk density is excessively low, the soot deposited layer is likely to crack. In a case where the bulk density of the soot deposited layer is in the above-described range, fluorine as a dopant is likely to be diffused, and the soot deposited layer is not likely to crack.

(Chlorine Addition Step)

By heating the porous preform in an atmosphere of gas containing a chlorine atom, chlorine can be added to the soot deposited layer while dehydrating the soot deposited layer.

The gas containing a chlorine atom is inert gas (for example, Ar or He) containing chlorine gas (for example, SOCl$_2$ or Cl$_2$).

In one or more embodiments, the temperature of the heating treatment is 1000° C. to 1300° C.

Due to the addition of chlorine, transmission loss can be reduced. In particular, in a case where the soot deposited layer is an inner cladding 12 (a layer adjacent to a core 11; refer to FIG. 4), an effect of reducing transmission loss is high. Chlorine may be added to the soot deposited layer that forms an outer cladding 13.

(Fluorine Addition Step)

By heating the porous preform in an atmosphere of gas containing a fluorine atom, fluorine can be added to the soot deposited layer in advance before a sintering step.

The gas containing a fluorine atom is inert gas (for example, Ar or He) containing fluorine gas. Examples of the fluorine-containing gas at this time include the same examples (SF$_6$, C$_2$F$_6$, SiF$_4$, CF$_4$) of the fluorine-containing gas used as the etching gas in the etching treatment. As the fluorine-containing gas, one type may be used alone, or two or more types may be used in combination.

In one or more embodiments, the temperature of the heating treatment is 1000° C. to 1300° C.

By providing the fluorine addition step before the sintering step, fluorine can be uniformly added to the preform.

The fluorine addition step may be performed during the formation of the outer cladding 13. In a case where fluorine can be uniformly added without providing the fluorine addition step, the fluorine addition step may be omitted. In addition, by causing the gas containing a chlorine atom and the gas containing a fluorine atom to flow at the same time, the chlorine addition step and the fluorine addition step can be performed at the same time.

(Sintering Step)

After depositing the silica glass particles on the etched surface of the core preform 10, the obtained porous silica preform for an optical fiber can treated for transparent vitrifying. The transparent vitrifying can be performed by sintering the porous silica preform for an optical fiber.

By performing the sintering treatment in the presence of the fluorine-containing gas, fluorine is added and the refractive index of the transparent vitrifying layer (outside vapor-deposited layer) can be reduced. Examples of the fluorine-containing gas at this time include the same examples (SF$_6$, C$_2$F$_6$, SiF$_4$, CF$_4$) of the fluorine-containing gas used as the etching gas in the etching treatment. As the fluorine-containing gas, one type may be used alone, or two or more types may be used in combination. In a case where the fluorine addition step is performed, the fluorine-containing gas used in the fluorine addition step is used in accordance with one or more embodiments.

In one or more embodiments, the sintering treatment is performed in the presence of inert gas such as helium gas.

By further forming an outside vapor-deposited layer to the outside of the formed transparent vitrifying layer (outside vapor-deposited layer) after the transparent vitrifying, an optical fiber glass preform can be formed.

The additionally formed outside vapor-deposited layer may be formed using a well-known method or may be formed with the above-described manufacturing method by using the glass preform obtained by the transparent vitrifying instead of the core preform 10.

The number and type of the additionally formed outside vapor-deposited layer can be optionally set according to the structure of the desired optical fiber glass preform.

In one or more embodiments, the outer diameter of the soot deposited layer after the sintering step is 5 times or less of the outer diameter of the core preform 10 (the outer diameter after the etching step). As a result, the soot deposited layer is not likely to crack, and thus the productivity can be improved. In addition, a variation in the outer diameter of the soot deposited layer in the longitudinal direction of the core preform 10 can be prevented. In addition, by adjusting the outer diameter of the soot deposited layer to be in the above-described range, fluorine atoms are likely to be diffused.

Figure 4:
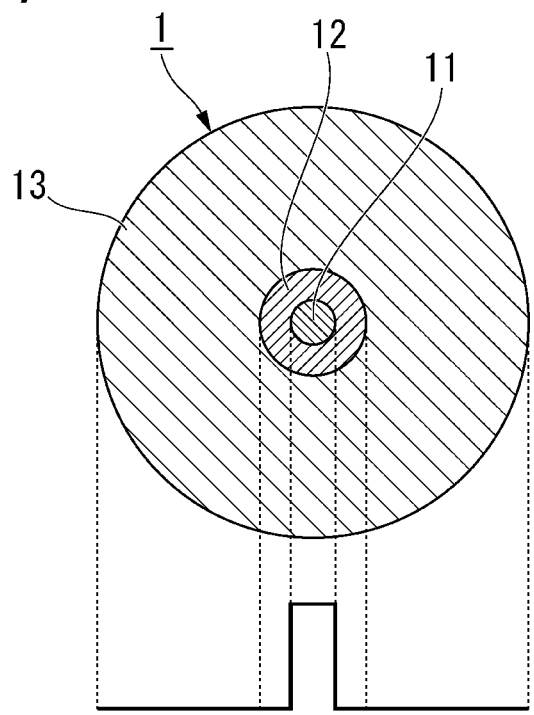
FIG. 4 is a schematic view showing a cross-section of an example of an optical fiber glass preform obtained using the manufacturing method according to one or more embodiments of the present invention and a refractive index of each layer according to one or more embodiments of the present invention.

FIG. 4 is a schematic view showing a cross-section of an example of an optical fiber glass preform obtained using the manufacturing method according to one or more embodiments and a refractive index of each layer according to one or more embodiments.

In an optical fiber glass preform 1 shown in FIG. 4, the core 11, the inner cladding 12, and the outer cladding 13 are provided in this order in a direction from the center to the outside.

The core 11 is formed of silica glass. In one or more embodiments, the core 11 is formed of silica glass substantially not containing germanium.

In order to obtain a desired refractive index, a dopant such as fluorine is added to each of the inner cladding 12 and the outer cladding 13.

The optical fiber glass preform 1 can be produced by applying the manufacturing method to the formation of each of the inner cladding 12 and the outer cladding 13.

Figure 5:
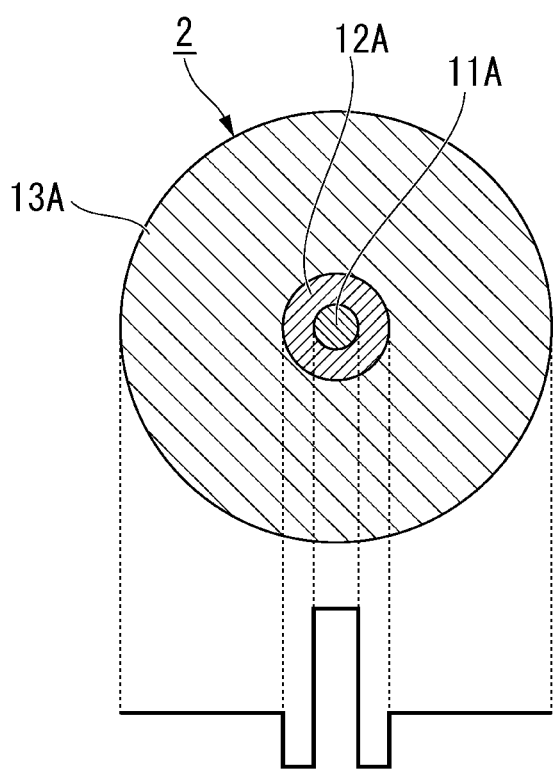
FIG. 5 is a schematic view showing a cross-section of another example of an optical fiber glass preform obtained using the manufacturing method according to one or more embodiments of the present invention and a refractive index of each layer according to one or more embodiments of the present invention.

FIG. 5 is a schematic view showing a cross-section of another example of an optical fiber glass preform obtained using the manufacturing method according to one or more embodiments of the present invention and a refractive index of each layer according to one or more embodiments.

In an optical fiber glass preform 2 shown in FIG. 5, a core 11A, an inner cladding 12A, and an outer cladding 13A are provided in this order in a direction from the center to the outside.

In order to obtain a desired refractive index, a dopant such as fluorine is added to each of the inner cladding 12A and the outer cladding 13A.

The optical fiber glass preform 2 can be produced by applying the manufacturing method to the formation of each of the inner cladding 12A and the outer cladding 13A.

Figure 6:
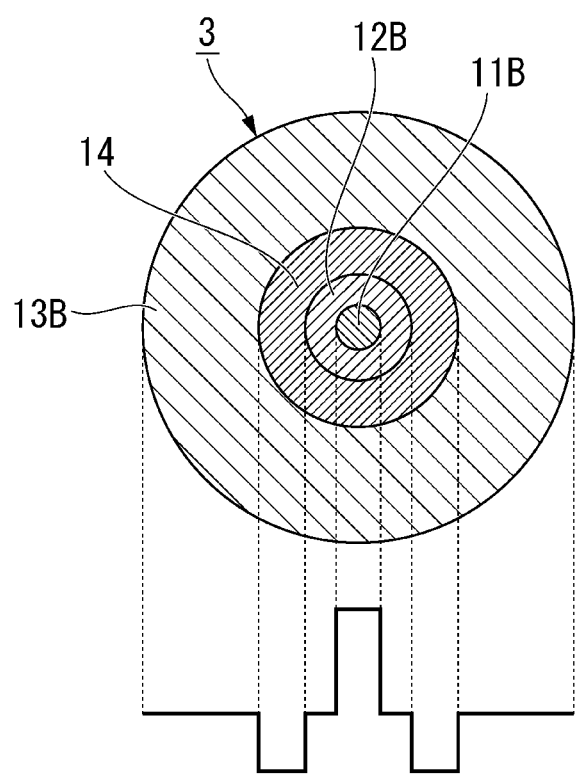
FIG. 6 is a schematic view showing a cross-section of still another example of an optical fiber glass preform obtained using the manufacturing method according to one or more embodiments of the present invention and a refractive index of each layer according to one or more embodiments of the present invention.

FIG. 6 is a schematic view showing a cross-section of still another example of an optical fiber glass preform obtained using the manufacturing method according to one or more embodiments of the present invention and a refractive index of each layer according to one or more embodiments.

In an optical fiber glass preform 3 shown in FIG. 6, a core 11B, an inner cladding 12B, a trench layer 14, and an outer cladding 13B are provided in this order in a direction from the center to the outside.

In order to obtain a desired refractive index, a dopant such as fluorine is added to each of the inner cladding 12B, the trench layer 14, and the outer cladding 13B.

The optical fiber glass preform 3 can be produced by applying the manufacturing method to the formation of each of the inner cladding 12B, the trench layer 14, and the outer cladding 13B.

The number of layers provided outside the core is not limited to two (refer to FIGS. 4 and 5) or three (refer to FIG. 6) and may be one or four or more.

The etching step to be performed by the plasma etching is essential for forming the inner cladding 12 (outside vapor-deposited layer) adjacent to the core 11. However, regarding the second or subsequent layer (for example, the outer cladding 13 or the trench layer 14), the etching step is not necessarily performed as long as an increase in loss at a wavelength of 1.55 µm caused by a hydroxyl group is small. In a case where the plasma etching is not performed, flame polishing using an oxy-hydrogen flame can be performed instead of the plasma etching.

In the manufacturing method according to one or more embodiments, the thickness of the soot deposited layer is not limited. Therefore, even in a case where the outer diameter of the core preform 10 is large, the thick soot deposited layer can be formed. Accordingly, it is easy to increase the size of the optical fiber preform.

In addition, unlike the above-described manufacturing method in which it is necessary to prepare a plurality of core preforms and a plurality of pipes, the thickness or refractive index of the soot deposited layer can be adjusted according to the outer diameter or refractive index of the core preform 10. Therefore, the production is easy, the costs can be reduced, and characteristics are also likely to be stable. In addition, circumstances (for example, impurities are likely to be incorporated or transmission loss is likely to increase during drilling or cleaning for the preparation of a pipe) caused by the preparation of a pipe or a collapsing step do not also occur.

EXAMPLES

Hereinafter, embodiments of the present invention will be described in more detail using Examples. However, the present invention is not limited to the following Examples.

Test Example 1

<Production of Optical Fiber Glass Preform>

An optical fiber glass preform in accordance with one or more embodiments was produced using the method described with reference to FIGS. 1 and 2. Specifically, the production was performed as follows.

(Etching Step)

The dummy preform 9 was coaxially connected to each of end portions of the core preform 10 (outer diameter: 20.0 mm) that was obtained by elongating a preform prepared using a vapor-phase axial deposition method. The dummy preforms 9 were held using the rotary chucks 8 and 8 in the reaction container 7. By moving the plasma torch 6 along the longitudinal direction of the core preform 10, the surface of the core preform 10 was etched with a plasma flame. The outer diameter of the etched core preform 10 was 19.4 mm Therefore, the outer diameter of the core preform 10 was reduced by 0.6 mm (Deposition Step)

Next, in a state where the core preform 10 was put into the reaction container 7, the silica glass particles were deposited on the core preform 10 immediately after the etching treatment while moving the silica glass burner 5 along the longitudinal direction of the core preform 10. The temperature of the surface of the core preform immediately before the deposition of the silica glass particles was 330° C. The deposition of the silica glass particles was performed by moving the silica glass burner 5 once in one direction from one end to another end of a glass rod. The deposition of the silica glass particles was performed 302 times by repeatedly moving only the silica glass burner 5 multiple times in the same direction as that of the first deposition.

The deposited silica glass particles were produced in an oxy-hydrogen flame by using silica glass source material gas, hydrogen gas, and oxygen gas, and further using argon gas and nitrogen gas as inert gas.

As a result, a porous silica preform for an optical fiber was prepared.

The flow rate of the silica glass source material gas was 1.5 SLM in the first deposit, reached 5 SLM (stable value) in the 32nd deposition (10.6% from the first deposition with respect to all the multiple times of depositions), and was maintained at 5 SLM until the final 302nd deposition. 1.5 SLM as the flow rate of the silica glass source material gas in the first deposition was 30% with respect to the stable value (5 SLM). The flow rate of the silica glass source material gas continuously increased from the first deposition to the 32nd deposition.

(Chlorine Addition Step)

The porous silica preform for an optical fiber was put into a sintering furnace and was heated to 1100 degrees in a gas atmosphere containing chlorine gas and inert gas.

(Sintering Step)

In the sintering furnace, the porous silica preform for an optical fiber was sintered in mixed gas of $SiF_4$ and helium, and fluorine was added thereto.

As a result, in the optical fiber glass preform 1 shown in FIG. 4, a portion (hereinafter, referred to as "intermediate preform") of the core 11 and the inner cladding 12 was prepared.

By performing the etching step, the deposition step, the chlorine addition step, and the sintering step on the intermediate preform under the same conditions as those of the inner cladding 12, the outer cladding 13 was formed.

As a result, the optical fiber glass preform 1 shown in FIG. 4 was obtained.

<Production of Optical Fiber>

The obtained optical fiber glass preform 1 was stranded using a method of the related art to produce an optical fiber in which the outer diameter of the outer cladding was 125 µm. The loss (1.55 µm loss) of the obtained optical fiber was measured. In addition, the number of breakings during drawing was recorded. In addition, whether or not deviation and delamination occurred between the core 11 and the inner cladding 12 in the intermediate preform was investigated. The measurement results are shown in Table 1.

Test Example 2

In accordance with one or more embodiments, a preheating step of leaving the preform to stand for 1 hour to sufficiently cool the preform after the etching step and heating the preform with a plasma flame was performed, and then the deposition step was performed. The preform surface temperature immediately before the deposition step was 310° C.

The optical fiber glass preform 1 and the optical fiber were produced under the same conditions as those of Test Example 1 except for the above-described conditions. The measurement results are shown in Table 1.

Test Example 3

In accordance with one or more embodiments, the optical fiber glass preform 1 and the optical fiber were produced under the same conditions as those of Test Example 1 except that the etching step was not performed. The temperature of the surface of the core preform immediately before the deposition of the silica glass particles was 21° C. The measurement results are shown in Table 1.

Test Example 4

In accordance with one or more embodiments, the optical fiber glass preform 1 and the optical fiber were produced under the same conditions as those of Test Example 1 except that flame polishing was performed with an oxy-hydrogen flame instead of the etching step. The temperature of the surface of the core preform immediately before the deposition of the silica glass particles was 540° C. The measurement results are shown in Table 1.

Test Example 5

In accordance with one or more embodiments, the optical fiber glass preform 1 and the optical fiber were produced under the same conditions as those of Test Example 1 except that a preheating step of taking out the core preform 10 from the reaction container 7 after the etching step, leaving the core preform 10 to stand, and putting the core preform 10 into the reaction container 7 again to heat the core preform 10 with a plasma flame was performed and the deposition step was performed. The measurement results are shown in Table 1. The preform surface temperature immediately before the deposition step was 315° C.

Test Example 6

In accordance with one or more embodiments, in the deposition step, the optical fiber glass preform 1 and the optical fiber were produced under the same conditions as those of Test Example 1 except that the flow rate of the silica glass source material gas was 5 SLM from the first deposition to the final 296th deposition. The measurement results are shown in Table 1.

Test Example 7

In accordance with one or more embodiments, the deposition step was performed without performing the preheating step of leaving the preform to stand for 1 hour to sufficiently cool the preform after the etching step and heating the preform with a plasma flame was performed. The preform surface temperature immediately before the deposition step was 22° C.

The optical fiber glass preform 1 and the optical fiber were produced under the same conditions as those of Test Example 1 except for the above-described conditions. The measurement results are shown in Table 1.

Test Example 8

In accordance with one or more embodiments, a preheating step of heating the preform with a plasma flame was performed without performing the etching step, and then the deposition step was performed. The preform surface temperature immediately before the deposition step was 310° C.

The optical fiber glass preform 1 and the optical fiber were produced under the same conditions as those of Test Example 1 except for the above-described conditions. The measurement results are shown in Table 1.

Test Example 9

In accordance with one or more embodiments, in the deposition step, the flow rate of the silica glass source material gas was 0.25 SLM in the first deposit, reached 5 SLM (stable value) in the 32nd deposition (10.7% from the first deposition with respect to all the multiple times of depositions), and was maintained at 5 SLM until the final 299th deposition. 0.25 SLM as the flow rate of the silica glass source material gas in the first deposition was 5% with respect to the stable value (5 SLM).

The optical fiber glass preform 1 and the optical fiber were produced under the same conditions as those of Test Example 1 except for the above-described conditions. The measurement results are shown in Table 1.

Test Example 10

In accordance with one or more embodiments, in the deposition step, the flow rate of the silica glass source material gas was 2.5 SLM in the first deposit, reached 5 SLM (stable value) in the 32nd deposition (10.3% from the first deposition with respect to all the multiple times of depositions), and was maintained at 5 SLM until the final 312nd deposition. 2.5 SLM as the flow rate of the silica glass source material gas in the first deposition was 50% with respect to the stable value (5 SLM).

The optical fiber glass preform 1 and the optical fiber were produced under the same conditions as those of Test Example 1 except for the above-described conditions. The measurement results are shown in Table 1.

Test Example 11

In accordance with one or more embodiments, in the deposition step, the flow rate of the silica glass source material gas was 3.5 SLM in the first deposit, reached 5 SLM (stable value) in the 32nd deposition (10.5% from the first deposition with respect to all the multiple times of depositions), and was maintained at 5 SLM until the final 304th deposition. 3.5 SLM as the flow rate of the silica glass source material gas in the first deposition was 70% with respect to the stable value (5 SLM).

The optical fiber glass preform 1 and the optical fiber were produced under the same conditions as those of Test Example 1 except for the above-described conditions. The measurement results are shown in Table 1.

Test Example 12

In accordance with one or more embodiments, in the deposition step, the flow rate of the silica glass source material gas was 2.5 SLM in the first deposit, reached 5 SLM (stable value) in the 64th deposition (20.9% from the first deposition with respect to all the multiple times of depositions), and was maintained at 5 SLM until the final 306th deposition. 2.5 SLM as the flow rate of the silica glass source material gas in the first deposition was 50% with respect to the stable value (5 SLM).

The optical fiber glass preform 1 and the optical fiber were produced under the same conditions as those of Test Example 1 except for the above-described conditions. The measurement results are shown in Table 1.

TABLE 1

| | Deviation or Delamination | Loss (dB/km) | Number of Breaking |
|---|---|---|---|
| Test Example 1 | None | 0.167 | 0 |
| Test Example 2 | None | 0.168 | 0 |
| Test Example 3 | Deviation | 0.754 | 7 |
| Test Example 4 | None | 0.668 | 0 |
| Test Example 5 | None | 0.177 | 3 |
| Test Example 6 | Delamination | 0.167 | 1 |
| Test Example 7 | Deviation | 0.168 | 0 |
| Test Example 8 | None | 0.692 | 6 |
| Test Example 9 | None | 0.168 | 0 |
| Test Example 10 | None | 0.167 | 0 |
| Test Example 11 | Deviation | 0.168 | 0 |
| Test Example 12 | None | 0.168 | 0 |

As shown in Table 1, in Test Examples 1, 2, 9, 10, 12, deviation or delamination of the soot deposited layer did not occur, the loss was also small, and breaking did not also occur during drawing.

On the other hand, in Test Example 3 in which the etching step was not performed, deviation of the soot deposited layer occurred. In addition, the loss was large, and breaking also occurred. In Test Example 3, it is presumed that, since the soot was deposited in a state where the preform was not heated by etching, the soot bulk density of the soot deposited layer near the interface was low and deviation of the soot deposited layer occurred. Further, it is presumed that, since a hydroxyl group in the glass surface was not removed by etching, the OH loss increased. In addition, it can be presumed that the insufficient cleaning of the surface of the core preform 10 caused breaking.

In Test Example 4, it is presumed that the remaining of a hydroxyl group on the surface of the core preform 10 due to the flame polishing with an oxy-hydrogen flame caused an increase in OH loss.

In Test Example 5, it can be presumed that, since the core preform 10 was taken out from the reaction container 7 after the etching step, the cleanliness of the surface of the core preform 10 deteriorated such that the number of breakings increased.

In Test Examples 6 and 11, it is presumed that, since the flow rate of the silica glass source material gas was high from the beginning, the deposited layer in which delamination from the core preform 10 was likely to occur at an early stage of the formation of the soot deposited layer was formed.

In Test Example 7, it is presumed that, since the preheating step of heating the preform with a plasma flame was not performed, the soot bulk density of the soot deposited layer near the interface was low and deviation of the soot deposited layer occurred.

In Test Example 8, it is presumed that, since a hydroxyl group in the glass surface was not removed by etching, the OH loss increased. In addition, it can be presumed that the insufficient cleaning of the surface of the core preform 10 caused breaking.

The manufacturing method according to one or more embodiments includes the core preform preparation step, the etching step, the preheating step, the deposition step, the chlorine addition step, and the sintering step. However, among these steps, either or both of the preheating step and the chlorine addition step can be omitted according to the circumstances.

In addition, as the method of preparing a core preform, a plasma method or an oxidation method such as an MCVD method (modified chemical vapor deposition method) can also be used. However, in one or more embodiments, a soot method such as a vapor-phase axial deposition method is used.

The optical fiber preform can also be configured to include a core and a cladding that is provided outside of the core. In this case, in the manufacturing method, the optical fiber preform forms the outside vapor-deposited layer on the outside surface of the core preform.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A manufacturing method of an optical fiber preform used to produce an optical fiber, the optical fiber including a core that is formed of silica glass and a cladding that is formed around an outer circumference of the core, the manufacturing method comprising:
    etching a surface of a core preform that forms the core with a plasma flame in a chamber;
    obtaining a porous preform by depositing glass particles on an etched surface of the core preform to form an outside vapor-deposited layer that forms the cladding in a state where the core preform is put into the chamber; and
    heating and sintering the porous preform, wherein
    when obtaining the porous preform, the outside vapor-deposited layer is formed by repeating the deposition of the glass particles multiple times through supply of source material gas, in a first deposition among the multiple times of deposition of the glass particles, a flow rate of the source material gas is less than or equal to 50% of a stable value, the flow rate of the source material is increased to the stable value in a number of depositions that corresponds to less than or equal to 21% of all the multiple times of deposition, and a temperature of the etched surface of the core preform at a start of depositing glass particles is greater than or equal to 50° C.

2. The manufacturing method of an optical fiber preform according to claim 1, wherein when obtaining the porous preform, the flow rate of the source material gas continuously increases, from the flow rate in the first deposition, until the flow rate of the source material gas reaches the stable value.

3. The manufacturing method of an optical fiber preform according to claim 1, wherein an average bulk density of the outside vapor-deposited layer is greater than or equal to 0.17 g/cm$^3$ and less than or equal to 0.33 g/cm$^3$.

4. The manufacturing method of an optical fiber preform according to claim 1, wherein before heating and sintering the preform and after obtaining the porous preform, the porous preform is heated in an atmosphere of gas that comprises a chlorine atom.

5. The manufacturing method of an optical fiber preform according to claim 1, wherein an outer diameter of the outside vapor-deposited layer, after heating and sintering the porous preform, is less than or equal to 5 times an outer diameter of the core preform.

6. The manufacturing method of an optical fiber preform according to claim 1, wherein when etching the surface of the core preform, an outer diameter of the core preform is reduced by 0.5 mm or more.

7. The manufacturing method of an optical fiber preform according to claim 1, wherein before obtaining the porous preform and after etching the surface of the core preform, the core preform is heated with a plasma flame.

8. The manufacturing method of an optical fiber preform according to claim 1, wherein the flow rate of the source material is increased to the stable value in a number of depositions that corresponds to equal to or more than 10.3% of all the multiple times of deposition.

9. The manufacturing method of an optical fiber preform according to claim 1, wherein when obtaining the porous preform, the outside vapor-deposited layer is formed so as to laminate a plurality of soot deposited layers in a radial direction of the core preform by repeating the deposition of the glass particles multiple times through supply of the source material gas, and among the plurality of soot deposited layers, a thickness of each of soot deposited layers formed before the flow rate of the source materials reach the stable value is thinner than a thickness of each of soot deposited layers formed after the flow rate of the source materials reach the stable value.

* * * * *